United States Patent [19]

Wagner

[11] E Patent Number: Re. 31,870

[45] Reissued Date of Patent: Apr. 23, 1985

[54] MEANS FOR YIELDABLY COUPLING A SHAFT TO COUNTER WHEELS OR THE LIKE

[75] Inventor: Friedemann Wagner, Furtwangen, Fed. Rep. of Germany

[73] Assignee: Ernst Reiner, KG Feinmechanik und Apparatebau, Furtwangen, Fed. Rep. of Germany

[21] Appl. No.: 393,376

[22] Filed: Jun. 29, 1982

Related U.S. Patent Documents

Reissue of:

[64] Patent No.: 4,299,512
Issued: Nov. 10, 1981
Appl. No.: 91,398
Filed: Nov. 6, 1979

[30] Foreign Application Priority Data

Nov. 6, 1978 [DE] Fed. Rep. of Germany ..... 2848039

[51] Int. Cl.[3] ..... B41J 1/60; B25G 3/28

[52] U.S. Cl. ..... 101/110; 403/357

[58] Field of Search ..... 403/357, 4; 285/321, 285/317, 304, 318; 74/527; 101/110, 111

[56] References Cited

U.S. PATENT DOCUMENTS

| | | | |
|---|---|---|---|
| 1,838,313 | 12/1931 | Kohn | 285/304 |
| 2,476,172 | 7/1949 | Williams | 285/317 X |
| 2,848,883 | 8/1958 | Doll'olio | 64/29 |
| 3,345,085 | 10/1967 | Hones | 285/321 X |
| 3,421,783 | 1/1969 | Sakai | 403/357 |
| 3,500,976 | 3/1970 | Halley | 403/4 |
| 3,968,745 | 7/1976 | Hamisch | 101/111 |
| 4,013,005 | 3/1977 | Keefe | 101/110 |
| 4,275,654 | 6/1981 | Hamisch et al. | 101/110 |

FOREIGN PATENT DOCUMENTS

| | | | |
|---|---|---|---|
| 2138370 | 2/1973 | Fed. Rep. of Germany | 101/110 |

*Primary Examiner*—Dave W. Arola
*Attorney, Agent, or Firm*—Peter K. Kontler

[57] ABSTRACT

A meter, counter, printer or a like device wherein a shaft carries one or more wheels whose angular position with respect to the shaft must be changed, either at regular or irregular intervals. The peripheral surface of the shaft has an elongated recess which is parallel to the axis of the shaft. The inner portion of the recess receives an elongated elastic cushion, and the outer portion of the recess confines the major portion of a helical spring with spaced-apart convolutions. The smaller portion of the spring extends into a selected socket in the internal surface of a wheel or into selected sockets in the internal surface of two or more wheels which surround the shaft. The angular positions of the wheels can be changed by rotating the shaft relative to a selected wheel or vice versa with a predetermined torque which suffices to expel the smaller portion of the spring from the socket of the selected wheel by simultaneous deformation of the elastic cushion whereupon the cushion expands and propels the smaller portion of the spring into another internal socket of the selected wheel when the other socket moves into register with the recess. The deformation of the spring in response to rotation of a selected wheel relative to the shaft or vice versa is limited to the region of the selected wheel so that the angular positions of the remaining wheels relative to the shaft remain unchanged.

33 Claims, 5 Drawing Figures

Fig. 1
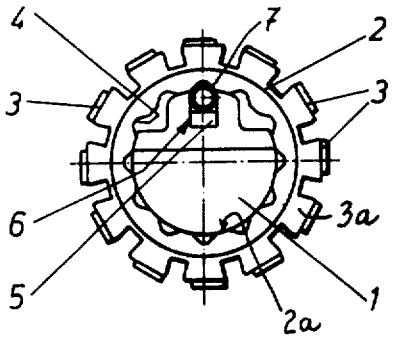
Fig. 3
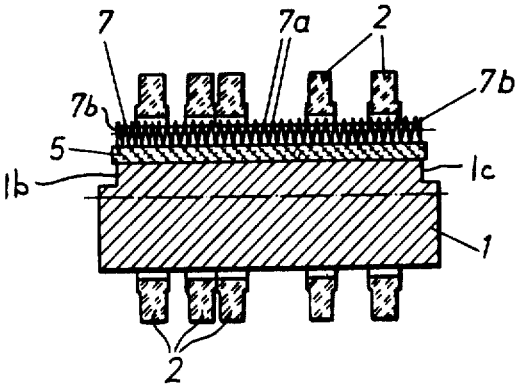
Fig. 2
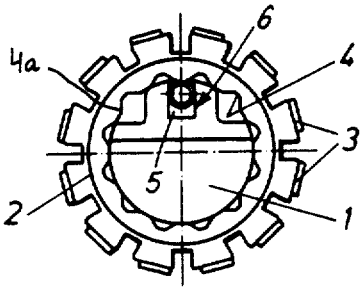
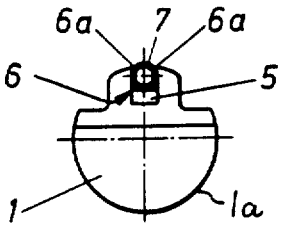
Fig. 4
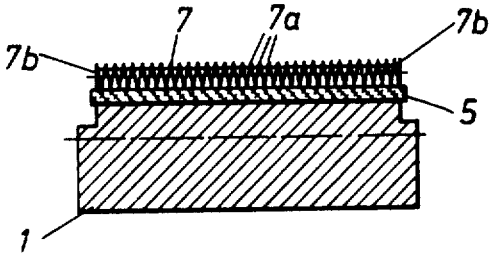
Fig. 5

MEANS FOR YIELDABLY COUPLING A SHAFT TO COUNTER WHEELS OR THE LIKE

Matter enclosed in heavy brackets [ ] appears in the original patent but forms no part of this reissue specification; matter printed in italics indicates the additions made by reissue.

BACKGROUND OF THE INVENTION

The present invention relates to meters, counters, printers and similar devices wherein a shaft carries one or more ring-shaped elements, particularly wheels, and the ring-shaped elements must be free to turn, at times, relative to the shaft or vice versa. Typical examples of devices to which the present invention pertains are odometers, paginators and apparatus for applying prices to items in supermarkets and similar establishments, i.e., devices which serve to apply or exhibit indicia in the form of numerals, letters and/or combinations of letters and numerals.

In devices of the above outlined character, the ring-shaped elements (e.g., the wheels of a counter) must be free to rotate with reference to the shaft or vice versa. For example, one wheel of a counter will turn through a small angle in response to a full revolution of the adjacent wheel, and so forth. As a rule, the internal surfaces of the wheels have angularly distributed sockets for detent elements which are yieldably mounted on the shaft to allow for rotation between the shaft and one or more wheels. In many presently known devices of the above described type, the detent elements are spring-biased balls which are urged into selected sockets of the adjacent wheels. It is also known to employ detent elements in the form of lamellae which are biased by rubber pads as well as in the form of pins having spherical heads and being biased into the sockets of the adjacent wheels.

A drawback of the above outlined and other known detent elements which couple a shaft to one or more wheels or similar ring-shaped elements is that their manufacturing cost is rather high and also that the assembly takes up a considerable amount of time. Thus, if the shaft carries several spring-biased balls or pins, its peripheral surface must be formed with a corresponding number of discrete accurately machined blind bores or holes. Moreover, the manufacturing cost of numerous springs, balls, lamallae, pins with spherical heads and like component parts is very high. Still further, one and the same shaft cannot be used with different types of ring-shaped elements, i.e., it is necessary to machine different series of shafts for each device wherein the axial length of wheels or analogous ring-shaped elements deviates from the axial length of such elements in another device. This will be readily appreciated since the spacing of holes for springs and balls in a shaft which is to be surrounded by relatively wide wheels must be different from the spacing of such holes or bores in the periphery of a shaft which is to support a set of thin wheels or like ring-shaped elements.

OBJECTS AND SUMMARY OF THE INVENTIQN

An object of the invention is to provide a novel and improved device which may constitute a counter, a meter, a printer or the like and wherein one or more ring-shaped elements are mounted on and must be angularly movable relative to a shaft.

Another object of the invention is to provide novel and improved means for coupling the ring-shaped elements to the shaft in a device of the above outlined character.

A further object of the invention is to provide coupling means which is simpler, more compact, and less expensive than heretofore known coupling or detent means.

An additional object of the invention is to provide a device wherein one and the same shaft can support thin, wide or average wheels or analogous ring-shaped elements as long as the diameter of the shaft matches or approximates the inner diameters of the ring-shaped elements.

A further object of the invention is to provide a device wherein the resistance which the coupling means offers to angular displacement of ring-shaped elements relative to the shaft or vice versa can be selected practically at will, wherein such resistance can be changed by the simple expedient of replacing a single component with a component of different consistency, and which can be put to a number of different uses as a superior substitute for heretofore known devices serving as counters, meters, paginators or the like.

One feature of the invention resides in the provision of a device for applying or exhibiting indicia, e.g., a meter, a counter, a printer, or any other device wherein one or more rotary elements in the form of rings or wheels are mounted on a shaft and the angular position of the shaft relative to one or more wheels must be changed, either at random or at regular intervals. The improved device comprises a shaft whose peripheral surface is provided with an elongated recess extending in parallelism with the axis of the shaft and preferably all the way from the one to the other end face of the shaft, at least one ring-shaped element (hereinafter called wheel for the sake of simplicity) which has an internal surface rotatably surrounding the peripheral surface of the shaft and at least two sockets in the internal surface, such sockets being spaced apart from each other, as considered in the circumferential direction of the shaft, and means for yieldably coupling the wheel to the shaft, including a helical spring having a first portion (which is preferably the major portion of the spring) in the recess and a second portion projecting from the recess and normally extending into one of the sockets in the internal surface of the wheel. The second portion of the spring is expelled from the one socket to penetrate, at least in part, into the recess in response to the application of a predetermind torque to the shaft in a direction to rotate the shaft relative to the wheel or vice versa. The second portion of the spring is free to enter the other socket in the internal surface of the wheel when such other socket is moved into register with the recess.

The device preferably further comprises an elongated elastic cushion (which may consist, either in part or entirely, of natural rubber or synthetic plastic material and is preferably of square or rectangular outline in the undeformed condition thereof) which is inserted into the recess inwardly of the first portion of the spring, as considered in the radial direction of the shaft, to yield whenever the second portion of the spring is expelled from a socket. The cushion further insures that the second portion of the spring enters another socket as soon as such other socket is moved into register with the recess, or vice versa.

The neighboring convolutions of the spring are preferably spaced apart from each other. This is especially desirable when the shaft carries two or more wheels because the spring then undergoes only local deformation in response to angular displacement of a single wheel with respect to the shaft or vice versa, i.e., each other wheel remains in the previously selected angular position with respect to the shaft. The spacing between neighboring convolutions of the spring may equal or approximate the diameter of the wire of which the spring is made.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments, with reference to the accompanying drawing.

BRIEF DESCRIPTION OF THE DRAWING

FIG. 1 is an end elevational view of a device which embodies the invention, the outer portion of the helical spring being received in selected sockets of several coaxial wheels;

FIG. 2 is a similar end elevational view with one of the wheels shown in an intermediate position in which the outer portion of the spring engages a ridge between two neighboring sockets in the internal surface of the wheel;

FIG. 3 is an axial sectional view of the device which is shown in FIG. 1;

FIG. 4 is an end elevational view of the shaft, of the spring and of the elastic cushion in the recess of the shaft; and FIG. 5 is an axial sectional view of the shaft and a longitudinal sectional view of the cushion.

DESCRIPTION OF THE PREFERRED EMBODIMENTS

The device which is shown in FIGS. 1 to 3 comprises a shaft 1 and several ring-shaped elements in the form of wheels 2 which are mounted on and can be rotated relative to the shaft 1 or vice versa. The peripheral surface 1a of the shaft 1 has an elongated recess or groove 6 which extends all the way between the two end faces 1b, 1c of the shaft 1 and is parallel to the axis of the shaft. The inner portion of this recess receives an elongated strip-shaped cushion 5 which, in the unstressed condition thereof, has a square or rectangular cross-sectional configuration (see FIGS. 1 and 4). The recess 6 further receives the larger first or inner portion of an elongated helical spring 7 which constitutes a means for yieldably coupling the wheels 2 to the shaft 1 so that the wheels remain in selected angular positions until and unless the cushion 5 and/or the spring 7 is deformed in response to the application of a predetermined torque to a selected wheel 2 and/or to the shaft 1. The outer portions of the wheels 2 have equally spaced springs or arms 3a, each of which carries an indicium 3, e.g., a numeral, a letter or the like which can be observed or which can serve for the application of an impression to items in stores, to pages of books or other publications or for similar or related purposes. If used as an odometer, the device is designed in such a way that one of the wheels turns through a predetermined angle in response to completion of a full revolution by the neighboring wheel. Alternatively, the wheels can be turned by the user, e.g., by resorting to a screwdriver or another rudimentary tool. The internal surfaces 2a of the wheels 2 have equally spaced sockets 4, one for each of the prongs 3a. One socket 4 of each wheel 2 normally receives the smaller outer or second portion of the spring 7, and such smaller outer portion of the spring 7 is biased into the selected socket 4 by the cushion 5.

As shown in FIG. 3, the internal surface 2a of each wheel 2 surrounds several convolutions 7a of the spring 7. This is desirable and advantageous for the following reason: If a selected wheel 2 is rotated relative to the shaft 1, the internal surface of such selected wheel displaces the corresponding convolutions 7a of the spring 7, i.e., such convolutions are expelled from a socket 4 of the wheel 2 which is to be rotated and the outer portions of such convolutions penetrate, at least in part, into the adjacent portion of the recess 6 to deform the corresponding part of the cushion 5. This enables the selected wheel 2 to rotate relative to the shaft 1 or vice versa. All other convolutions 7a of the spring 7 remain at least substantially undeformed, i.e., the angular positions of the other wheels 2 with respect to the shaft 1 remain unchanged. The just described desirable localized deformation of the spring 7 is even more likely to occur if the neighboring convolutions 7a of the spring 7 are spaced apart from each other. The spacing between neighboring convolutions 7a can equal or approximate the diameter of the wire of which the spring 7 consists. The wire is preferably (but need not be) a metallic wire. The spacing between neighboring convolutions 7a of the spring 7 can be readily seen in FIGS. 3 and 5.

The cushion 5 may consist of rubber or of a suitable elastomeric synthetic plastic material. The cost of such cushion is negligible and, as shown in FIGS. 3 and 5, the cushion can extend all the way to, and even slightly beyond, the two end faces 1b, 1c of the shaft 1. The material of the cushion 5 should be sufficiently elastic to allow for localized deformation of the spring 7, i.e., for penetration of selected convolutions 7a deeper into the recess 6 whenever the corresponding wheel 2 is rotated relative to the shaft and/or vice versa. Once a ridge 4a between two neighboring sockets 4 of a wheel 2 advances beyond the outer portion of the spring 7, the latter is free to reassume its normal condition whereby the outer portions of the corresponding convolutions 7a enter that socket 4 which has been moved into register with the recess 6.

It is also within the purview of the invention to employ a coupling means which consists of two or helical springs 7 disposed end-to-end. Such construction may be necessary if the shaft 1 is relatively long. As a rule, it suffices to resort to a single helical spring 7 whose length preferably equals or at least approximates the length of the recess 6, i.e., the length of the shaft 1. The provision of a single helical spring 7 contributes to lower cost of the device and allows for more convenient and more rapid assembly of its components.

The substantially T-shaped or mushroom-shaped cross-sectional outline of the shaft 1 (see FIGS. 1, 2 and 4) is optional. All that counts is to insure that the internal surfaces 2a of the wheels 2 or analogous ring-shaped elements can readily rotate about the peripheral surface 1a, either in the absence of the spring 7 or in response to the application of a predetermined torque to the shaft 1 and/or to a selected wheel 2 so as to overcome the resistance of the cushion 5 and to enable the outer portions of corresponding convolutions 7a to penetrate into the adjacent portion of the recess 6.

The width (as considered in the circumferential direction of the shaft 1) of the major portion of or the entire recess 6 preferably equals or closely approximates the outer diameter of the spring 7. The radially outermost portion of the recess 6 is somewhat narrower (between the portions 6a shown in FIG. 4) than the inner or main portion of the recess. This is desirable and advantageous because the major or inner portion of the spring 7 is thereby confined in the recess 6. However, the extent of undercut at 6a, 6a is preferably so small that is does not interfere with necessary movements of convolutions 7a relative to the recess 6. The spring 7 is not only yieldable in a direction toward the axis of the shaft 1 but is also deformable to a certain extent so that its outer portion can be readily pushed into the recess 6 in response to engagement by a ridge 4a at the inner side of a selected wheel 2.

As mentioned above, when in unstressed condition, the cushion 5 has or can have a square or rectangular cross-sectional configuration. This simplifies the manufacture of the cushion and its insertion into the inner portion of the recess 6. If desired, the ends of the recess 6 can be closed to prevent undesirable axial displacements of the spring 7 therein. However, it suffices, in most instances, to employ a shaft wherein the recess 6 is open at both ends.

FIGS. 3 and 5 show that the two outermost convolutions or end convolutions 7b of the spring 7 include portions which are located in planes extending at right angles to the axis of the spring. The portions which are located in such planes are preferably the outer portions of the end convolutions 7b and may extend along arcs of 180 degrees, i.e., each such portion constitutes approximately 50 percent of the respective convolution 7b. This insures that the tips of the spring 7 do not project beyond the major parts of the outer convolutions 7b. Moreover, the ends of the spring 7 cannot be caught when the shaft 1 is inserted into bearings or the like. In fully inserted condition of the shaft 1, its end faces 1b and 1c normally engage suitable abutments or stops, not shown.

In many instances, the outer diameter of the spring 7 can be between two and three millimeters, and the diameter of the wire of which the spring 7 consists can be between 0.25 and 0.5 millimeter, preferably 0.35 millimeter. As mentioned above, the spacing between neighboring convolutions 7a of the spring 7 is preferably equal to or approximates the diameter of the wire (i.e., such spacing is between 0.25 and 0.5 mm and preferably 0.35 mm). The lead of the convolutions 7a (i.e., the inclination of the planes of these convolutions to the axis of the spring 7) is preferably between 5 and 10 degrees, most preferably approximately 7.5 degrees. A spring of the just outlined character can be used in combination with heretofore known wheels of counters, meters, paginators, etc. because its outer portion can readily enter the internal sockets of conventional counting, numbering or printing wheels.

An important advantage of the improved device is its low cost and simplicity. This is attributable to the surprising discovery that the heretofore known coupling or detent means in the form of several discrete spring-biased balls, lamellae and/or pins with spherical heads can be replaced by a simple helical spring and that numerous discrete recesses, bores or holes in the peripheral surface of the shaft can be replaced with a single recess or groove which extends or may extend all the way between the two end faces of the shaft. As explained above, angular adjustment of one of several coaxial wheels or analogous ring-shaped elements need not entail any changes in the angular position of the other wheel or wheels in spite of the fact that a single spring serves as a means for coupling the shaft to two, three or more coaxial wheels. The utilization of a single spring as a coupling means for two or more wheels simplifies the assembly of the device, not only as concerns the time element but also as concerns the required skill of the person or persons in charge. Moreover, the device can be economically assembled in semiautomatic or fully automatic machines of simple construction, even if the number of devices to be assembled is relatively small. The width of the wheels 2 (as considered in the axial direction of the shaft 1) is of no consequence because the socket of a relatively wide wheel simply receives a larger number of convolutions 7a and the socket of a narrower wheel receives fewer convolutions 7a. Also, wide wheels can be replaced with narrower wheels or vice versa, while the shaft remains the same.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In a device for applying or exhibiting indicia, the combination of a shaft having a peripheral surface and a recess provided in said peripheral surface and extending in parallelism with the axis of the shaft; at least one wheel having an internal surface rotatably surrounding said shaft and provided in said internal surface with at least two sockets which are spaced apart from each other, as considered in the circumferential direction of said shaft; and means for yieldably coupling said wheel to said shaft, including a helical spring extending in parallelism with the axes of the shaft and having a first portion in said recess and a second portion projecting from said recess and normally extending into one of said sockets, said internal surface having means thereon which will result in said second portion being expelled from said one socket to penetrate at least in part into said recess in response to the application of a predetermined torque to said shaft in a direction to rotate the latter relative to said wheel or vice versa and said second portion of said spring being free to enter the other of said sockets when said other socket registers with said recess.

2. The combination of claim 1, further comprising an elastic cushion installed in said recess inwardly of said first portion of said spring, as considered radially of said shaft.

3. The combination of claim 2, wherein at least a portion of said cushion consists of rubber.

4. The combination of claim 2, wherein at least a portion of said cushion consists of synthetic plastic material.

5. The combination of claim 2, wherein said cushion has a substantially rectangular or square cross-sectional configuration in the undeformed condition thereof.

6. The combination of claim 1, wherein said spring has a plurality of convolutions and the neighboring convolutions are spaced apart from each other.

7. The combination of claim 1, wherein said recess is open at both ends of said shaft and the length of said spring at least approximates the length of said recess.

8. The combination of claim 1, wherein said spring includes two end convolutions and at least a portion of each end convolution is located in a plane which is substantially normal to the axis of said spring.

9. The combination of claim 8, wherein said portions of said end convolutions constitute approximately 50 percent of the respective end convolutions.

10. The combination of claim 1, wherein the outer diameter of said spring is between two and three millimeters.

11. The combination of claim 1, wherein the diameter of the wire of said spring is between one-fourth and one-half of one millimeter.

12. The combination of claim 1, wherein said spring comprises a plurality of convolutions and the neighboring convolutions are spaced apart from each other, the spacing between such neighboring convolutions being equal to or approximating the diameter of the wire of said spring.

13. The combination of claim 12, wherein said spacing is between one-half and one-fourth of one millimeter.

14. The combination of claim 12, wherein said spacing is approximately 0.35 millimeter.

15. The combination of claim 1, wherein the lead of said spring is between 5 and 10 degrees.

16. The combination of claim 1, wherein the lead of said spring is approximately 7.5 degrees.

17. The combination of claim 1, wherein said recess has a width, as considered in the circumferential direction of said shaft, which approximates the outer diameter of said spring.

18. The combination of claim 17, wherein said recess has a portion of reduced width at said peripheral surface so that said first portion of said spring is held against accidental withdrawal from said recess.

19. The combination of claim 18, wherein said first portion is the larger portion of said spring.

*20. In a printer, a plurality of axially aligned wheels, each having a plurality of different printing elements coupled thereto, a support for rotatably supporting said wheels, said wheels having holes defining a continuous opening, each of said wheels also having a series of recesses, detenting means including a metal helical spring engaging a plurality of said wheels for detenting the wheels, said detenting means including means providing a recess in said support, said recess in said support having an open side, said helical spring being disposed in said recess in said support and projecting beyond the open side into one recess in each wheel to detent the wheels and align selected printing elements at a printing zone.*

*21. A printer as in claim 20, wherein the recesses in said wheels have inclined surfaces cooperable with said helical spring to cam selected printing elements to printing positions.*

*22. The printer defined in any of claims 20 or 21 wherein the helical spring is of one-piece construction.*

*23. The printer defined in any of claims 20, 21 or 22 wherein the helical spring is composed of wound wire and has a diameter substantially less than the thickness of a wheel.*

*24. In a device for applying or exhibiting indicia, the combination of a plurality of axially aligned wheels, a supporting surface for said wheels coaxial therewith, a supporting surface recess provided in said supporting surface and extending in parallelism with the axis of said wheels, each wheel having at least two wheel recesses spaced apart circumferentially of said wheel, and means for yieldably coupling said wheels to said support surface, including a helical spring extending in parallelism with the axis of said wheels and having a first portion in said supporting surface recess and a second portion projecting from said supporting surface recess and normally extending into one of said wheel recesses, said wheels having means thereon adapted to expel said spring second portion from one wheel recess of a wheel to penetrate at least in part into said supporting surface recess in response to the application of a predetermined torque to said wheel, said second spring portion being free to enter another wheel recess of the wheel when the latter wheel recess is in register with said supporting surface recess.*

*25. The combination of claim 24 further comprising an elastic cushion in said surface recess behind said first spring portion.*

*26. The combination of claim 25 wherein at least a portion of aid cushion consists of a rubbery material.*

*27. The combinaion of claim 25 wherein said cushion has a substantially rectangular cross-sectional configuration when undeformed.*

*28. The combination of claim 24 wherein said spring has a plurality of convolutions, and the neighboring convolutions are spaced apart from each other.*

*29. The combination of claim 24 wherein said spring has a length approximately equal to the length of said recess in an axial direction.*

*30. The combination of claim 24 wherein said surface recess has a circumferential width approximately equal to the outer diameter of said spring.*

*31. The combination of claim 24 wherein said surface recess has a portion of reduced width at said supporting surface so that said spring is held against accidental withdrawal from said surface recess.*

*32. The combination as in claim 24 wherein said support surface is the outer surface of a shaft, said wheels being in the form of rings rotatably supported on said shaft, and said wheel recesses are on the surfaces of said wheel rings.*

*33. An invention as in claim 20 including means for engaging and rotating any selected wheel to bring a selected printing element to a printing zone.*

* * * * *